United States Patent
Hayashi et al.

(10) Patent No.: US 6,771,296 B2
(45) Date of Patent: Aug. 3, 2004

(54) OPTICAL SCANNING DEVICE AND METHOD FOR PROVIDING SPECIFIC DOT OFFSETS AT CENTER AND ENDS OF SCAN WIDTH

(75) Inventors: Yoshinori Hayashi, Kawasaki (JP); Takeshi Ueda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 274 days.

(21) Appl. No.: 09/968,546

(22) Filed: Oct. 2, 2001

(65) Prior Publication Data

US 2002/0039132 A1 Apr. 4, 2002

(30) Foreign Application Priority Data

Oct. 3, 2000 (JP) ........................................ 2000-303138

(51) Int. Cl.[7] ................................................ F02B 26/10
(52) U.S. Cl. ........................ 347/116; 347/234; 347/249
(58) Field of Search ............................... 347/116, 232, 347/233, 234, 235, 248, 249; 359/204

(56) References Cited

U.S. PATENT DOCUMENTS

| | | | |
|---|---|---|---|
| 5,557,448 A | 9/1996 | Endo et al. | |
| 5,570,224 A | 10/1996 | Endo et al. | |
| 5,581,392 A | 12/1996 | Hayashi | |
| 5,652,670 A | 7/1997 | Hayashi | |
| 5,875,051 A | 2/1999 | Suzuki et al. | |
| 5,986,791 A | 11/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,185,026 B1 | 2/2001 | Hayashi et al. | |
| 6,198,562 B1 | 3/2001 | Hayashi et al. | |
| 6,222,662 B1 | 4/2001 | Suzuki et al. | |
| 6,342,963 B1 * | 1/2002 | Yoshino | 359/204 |
| 6,400,917 B2 | 12/2002 | Nakazato et al. | |
| 2001/0028387 A1 * | 10/2001 | Maeda | 347/232 |

FOREIGN PATENT DOCUMENTS

| | | | |
|---|---|---|---|
| JP | 2-291573 A | * | 12/1990 |
| JP | 4-355776 A | * | 12/1992 |
| JP | 8-156332 A | * | 6/1996 |
| JP | 10-148775 | | 6/1998 |
| JP | 11-326804 | | 11/1999 |

* cited by examiner

*Primary Examiner*—Joan Pendegrass
(74) *Attorney, Agent, or Firm*—Oblon, Spivak, McClelland, Maier & Neustadt, P.C.

(57) ABSTRACT

An optical scanning device includes a plurality of light sources, a drive circuit connected to the light sources to drive the light sources independently with from each other in a modulating manner, a deflector having a plurality of deflecting surfaces to deflect rays emitted from the light sources and scan imaging optical systems directing the deflected rays onto different scan surfaces respectively. The optical scanning device further includes synchronization detection means for receiving the rays before start writing onto the scan surface and outputting synchronization detection signals, delay time adjusting means for adjusting delay time, the delay time being a time period after outputting the synchronization detecting signal until starting the writing operation, and frequency adjustment means for adjusting driving frequencies of the light sources.

19 Claims, 4 Drawing Sheets

- INITIAL VALUE
- CURVATURE OF PLANE MIRROR 50mR
- OPTICAL PATH LENGTH 0.9mm

| SURFACE # | Rm(mm) | Rs (0) (mm) | X (mm) | N | REMARKS |
|---|---|---|---|---|---|
| DEFLECTING SURFACE | ∞ | ∞ | 52.7 (L1) | | POLYGON MIRROR |
| 1* | -312.6 | -312.6 | 31.4 (d1) | 1.524 | SCAN IMAGING LENS |
| 2* | -83.0 | -83.0 | 78.0 (L2) | | |
| 3** | -500 | -47.7 | 3.5 (d2) | 1.524 | SCAN IMAGING LENS |
| 4 | -1000 | 23.38 | 143.9 (L3) | | |
| 5 | − | − | | | SCAN SURFACE |

# OPTICAL SCANNING DEVICE AND METHOD FOR PROVIDING SPECIFIC DOT OFFSETS AT CENTER AND ENDS OF SCAN WIDTH

BACKGROUND OF THE INVENTION

1. Field of the Invention

The present invention generally relates to an optical scanning device and an image-forming device, and particularly relates to a multicolor image-forming device applicable to color laser printers, color digital copiers and color facsimile devices.

2. Description of the Related Art

One of the optical scanning devices applicable to multi-color image-forming devices is a so-called multi-beam scanning device which includes a plurality of light sources, a drive circuit for driving the light sources individually in a modulating manner, a deflector for deflecting rays emitted from the light sources and a scan-imaging optical system directing the deflected rays towards different surfaces. Surfaces to be scanned are hereinafter referred to as scan surfaces. The multi-beam scanning device is capable of optically scanning the plurality of scan surfaces individually. Therefore, the multi-beam scanning device may serve as an optical scanning device applicable to a multicolor image-forming device. Also, in contrast to a single-beam scanning device, images can be formed without having to rotate a photo-sensitive drum through a plurality of revolution. Thus, multicolor images can be formed at an increased speed and with improved productivity.

One of the image-forming devices of the prior art utilizing a multi-beam scanning device is known from Japanese Laid-Open Patent Application No. 10-148775. A galvano-mirror is used as an optical deflector. Two rays are deflected on one side of the galvano-mirror and two rays are deflected on other side of the galvano-mirror, such that the deflected rays scan corresponding image carrier surfaces respectively in order to record images.

The images recorded on the image carrier surfaces are transferred and superimposed on a single transfer belt or on a single sheet of transfer paper. Thus, the image recorded on one of the image carrier surfaces and the image recorded on another one of the image carrier surfaces need to be formed with high positioning accuracy. Also, each image must have high image magnification accuracy. If the positioning accuracy and the magnification accuracy of each image are not sufficiently high, the resulting image obtained by transferring and superimposing the images will not become sharp and a color offset occurs. Accordingly, the prior art technology cited above includes the steps of arranging two light-receiving elements along a main scan direction, determining a modulation start timing of the light sources based on detection signals of the deflected lights supplied by the two light-receiving elements and correcting the image magnification based on a difference of the timings between the deflected lights detected by the two light-receiving elements.

Another example of the color image-forming device utilizing a multi-beam scanning device is known from Japanese Laid-Open Patent Application No. 11-326804. There are four sets of image-forming devices corresponding to colors required for forming a color image, e.g., four colors such as cyan, magenta, yellow and black. Each set includes a light source, an optical deflector, a scan-imaging optical system and an image carrier. A displaceable diffraction is provided for each set of image-forming device. The magnification factor in the main scan direction of the image to be formed is corrected by displacing each diffracting optical element in a longitudinal direction.

However, with a multi-beam type multi-color image-forming device, there is a need for reducing an offset between images formed on different scan surfaces corresponding to each of the colors in order to reduce the resulting color offset produced when the images are superimposed. Recently, there is a need for a multi-color image-forming device with higher accuracy.

With the prior art multi-color image-forming device, it is particularly difficult to correct the color offset in the main scan direction and thus the accuracy of correction was not sufficient. Therefore, there is a need for a multi-color image-forming device with improved accuracy of correction.

SUMMARY OF THE INVENTION

Accordingly, it is a general object of the invention to provide an optical scanning device and an image-forming device which can satisfy the needs described above.

It is another and more specific object of the present invention to provide an optical scanning device which can correct relative dot position offset in the main scan direction for each scan surface.

According to the present invention, an optical scanning device includes:

a plurality of light sources;

a drive circuit connected to the light sources to drive the light sources independently with from each other in a modulating manner;

a deflector having a plurality of deflecting surfaces to deflect rays emitted from the light sources;

scan imaging optical systems directing the deflected rays onto different scan surfaces, respectively;

synchronization detection means for receiving the rays before start writing onto the scan surface and outputting synchronization detection signals;

delay time adjusting means for adjusting delay time, the delay time being a time period after outputting the synchronization detecting signal until starting the writing operation; and frequency adjustment means for adjusting driving frequencies of the light sources.

With the optical scanning device described above, since the position offsets of dots formed on one scan surface and dots formed on the other scan surface are adjusted to be in an opposite sense at both ends of an effective write-in width, relative position offsets in the main scan direction of the dots formed on different scan surfaces can be corrected.

DETAILED DESCRIPTION OF THE PREFERRED EMBODIMENTS

In the following, principles and embodiments of an optical scanning device and an image-forming device of the present invention will be described with reference to the accompanying drawings.

Figure 1:
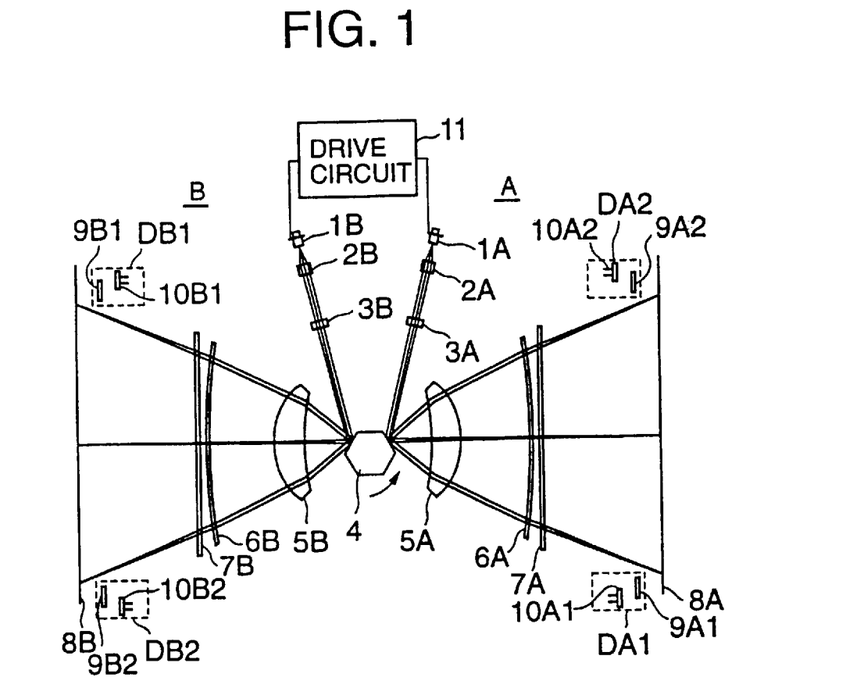
FIG. 1 is an illustration of an optical scanning device of an embodiment of the present invention along a main scan plane.

FIG. 1 is an illustration of an optical scanning device of an embodiment of the present invention viewed in a main scan plane. A scan-imaging optical system on the right is labeled with a symbol A and a scan-imaging optical system on the left is labeled with a symbol B. Each optical system includes the following elements:

1A, 1B: light source such as a semiconductor laser;
2A, 2B: coupling lens;
3A, 3B: cylindrical lens having a power in the sub-scan direction;
4: deflector such as a rotating polygon mirror;
5A, 5B: first scan-imaging lens (first imaging lens);
6A, 6B: second scan-imaging lens (second imaging lens);
7A, 7B: dust-proof glass;
8A, 8B: surface to be scanned (scan surface);
DA1, DB1: starting-side light receiving means; and
DA2, DB2: terminating-side light receiving means.

Referring to FIG. 1, the right scan-imaging optical system A will be described. Rays emitted from the light source 1A are coupled by the coupling lens 2A. The coupled rays pass through the cylindrical lens 3A having a power only in the sub-scan direction and is imaged as a line image extending in the main scan direction near one of the deflecting (or reflecting) surfaces of the deflector 4. In the illustrated embodiment, the optical deflector 4 is driven to rotate in an anticlockwise direction as shown by an arrow. The optical deflector 4 deflects the rays incident on the deflecting surfaces at a constant angular velocity for a predetermined range of angle. The deflected rays pass through the first and second imaging lenses 5A, 6A and the dust-proof glass 7A and is imaged on the scan surface 8A. Then, the rays pass through the first and second imaging lenses 5A, 6A having an fθ function and scans the scan surface 8A at a substantially constant speed. The imaging lens 5A and 6A are located such that the deflecting surface and the scan surface 8A are in a conjugate relationship, so as to compensate for the variation in imaging positions on the scan surface 8A due to inclination of the deflecting surfaces.

The left scan-imaging optical system B of FIG. 1 has structure similar to the right scan-imaging optical system A such that the right and left scan-imaging optical systems A and B are line symmetrical. That is to say, with the scan-imaging optical system B, the rays from the light source 1B passes through the coupling lens 2B and the cylindrical lens 3B, and is imaged near another one of the deflecting surfaces of the deflector 4 as a line image extending in the main scan direction. Then, the rays incident on the deflecting surface is deflected at a constant angular velocity. The deflected rays pass through the first and second imaging lenses 5B and 6B. The rays are imaged on the scan surface 8B and scan the scan surface 8B at a substantially constant speed. The imaging lens 5B and 6B are located such that the deflecting surface and the scan surface 8B are in a conjugate relationship, and has a function of compensating for the variation in imaging positions on the scan surface 8B due to inclination of the deflecting surfaces.

The scan-imaging optical systems A and B are provided with light-receiving means DA1 and DB1, respectively. The light-receiving means DA1 and DB1 serve as synchronization detecting means and are provided for acquiring synchronization detection signals before the scan surfaces 8A and 8B are scanned and written by the rays. Other light-receiving means DA1 and DB2 are provided for acquiring end-of-scan signals. The light-receiving means DA1 and DA2 include mirrors 9A1, 9B1 which reflect the deflected rays before a writing operation on the scan surface and also include light-receiving elements 10A1, 10B1 which receive the reflected rays from the mirrors 9A1, 9B1, respectively. The light-receiving means DA2 and DB2 include mirrors 9A1, 9B1 which reflect the deflected rays after the writing operation and also include light-receiving elements 10A2, 10B2 which receive the reflected rays from the mirrors 9A2, 9B2, respectively.

The light sources 1A and 1B are driven by a drive circuit 11 so as to be modulated in accordance with image signals to be formed. The modulation of the light sources 1A and 1B in accordance with the image signals starts at an instant where a predetermined delay time has elapsed after outputting the synchronization signals from the light-receiving means DA1 and DB1. The delay time is adjustable by delay time adjusting means. Also, the drive circuit 11 is driven by clock signals having a predetermined driving frequency which is adjustable by frequency adjusting means.

In order to compensate for magnification error due to a shape error or a mounting error of each optical system, firstly, a time taken for the rays to pass between the light-receiving means DA1 and DA2 in the scan imaging optical system A and a time taken for the rays to pass between the light-receiving means DB1 and DB2 in the scan imaging optical system B are measured. Then, based on the measured times, the driving frequencies are altered individually to compensate for the magnification error. When the measured time is too long, the driving frequency is adjusted to a higher value and when the measured time is too short, the driving frequency is adjusted to a lower value. With such an adjustment, the lengths of optical scanning regions (effective write-in widths) on the one scan surface 8A and on the other scan surface 8B are matched. Also, the optical scanning starting positions on the scan surface 8A and on the other scan surface 8B can be matched by adjusting the delay times TA and TB which are time periods between instants at which the rays are detected at the light-receiving means DA1 and DB1 and instants of starting the writing operation, respectively.

Figure 5:
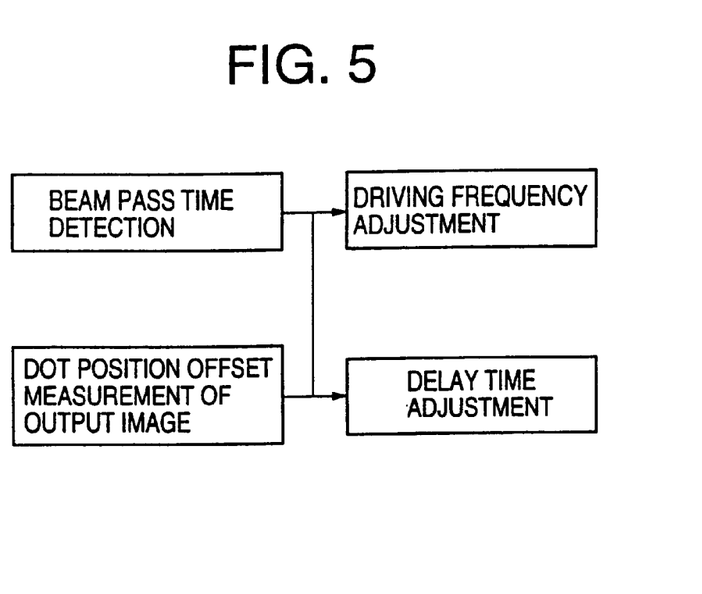
FIG. 5 is a flowchart showing processes of dot position adjustment performed by the optical scanning device shown in FIG. 1.

An image-writing operation and an image-forming operation on the scan surface are implemented by forming very small light dots along a straight line. Color offset in the resulting color image may be corrected by adjusting an offset of dot positions on the scan surfaces 8A and 8B such that the dot positions are matched. FIG. 5 is a flowchart showing process steps of a method of correcting dot positions. As shown in FIG. 5, the driving frequency and the delay time are adjusted based on the detected passing times of the beams between the light-receiving means DA1 and DA2 and between the light-receiving means DB1 and DB2, and the results of measurements of dot position offsets in the main scan direction of the output image.

It is to be noted that the adjustment of the delay time between the instant of detecting the synchronization detection signal and the instant of starting writing operation may be implemented electrically or mechanically. An example of mechanical adjustment is to adjust angles of mirrors 9A1 and 9B1 which direct rays to the light-receiving means DA1 and DB2.

Figure 2A:
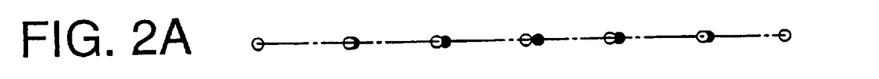
FIG. 2A is a diagram showing dots formed on a scan surface by the optical scanning device of FIG. 1.
Figure 2B:
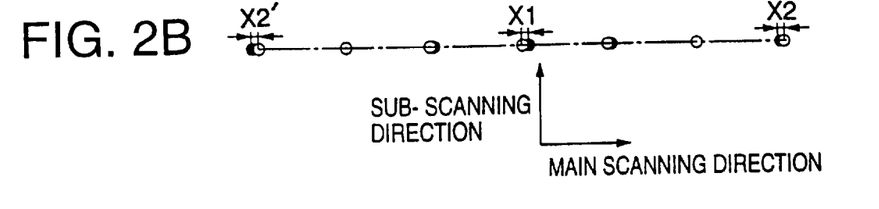
FIG. 2B is a diagram showing dots formed on a scan surface by the optical scanning device of FIG. 1 after performing dot offset correction.

FIGS. 2A and 2B are model diagrams showing dot position offsets. The dots on the scan surface 8A of the scan imaging optical system A is shown by white circles and the dots on the scan surface 8B of the scan imaging optical system B is shown by black circles.

FIG. 2A illustrates a case in which driving frequencies and delay times are adjusted such that dot positions are matched in the main scan direction in both end regions of the effective write-in width. However, in a case shown in FIG. 2A, the dot position offset is comparatively great in the center region, and thus color offset is noticeable.

FIG. 2B illustrates a case in which an adjustment of the driving frequencies and an adjustment of the delay times are combined such that a sense of relative dot position offsets X2, X2' in the main scan direction in both end regions of the effective write-in width is adjusted to be opposite with respect to a sense of a relative dot position offset X1 at in the center region of the effective write-in width. Accordingly, in an embodiment shown in FIG. 2B, the maximum value of dot position offset is smaller than that of the embodiment shown in FIG. 2A, and thus color offset is less noticeable.

In case where the amount of dot position offset in the main scan direction in both end regions of the effective write-in width is small, an adjustment may be carried out such that a sense of relative dot position offset at one of the effective write-in width becomes opposite to a sense of relative dot position offset in the center region of the effective write-in width.

More preferably, an adjustment may be carried out such that a sense of relative dot position offset at one of the effective write-in width with greater amount of dot position offset becomes opposite to a sense of relative dot position offset at the center region of the effective write-in width.

Also, a color offset is minimized when $|X1|=|X2|=|X2'|$.

Dot position offsets in the main scan direction for other colors on an image carrier in the color image-forming device having the above-described optical scanning device may be minimized in a similar manner.

In the following, a detailed embodiment of the scan imaging optical system A and B will be described.

It is assumed that the wavelength at light sources is 780 nm. Except for light sources, optical elements are commonly used between the scan imaging optical system A or B.

Figure 9:
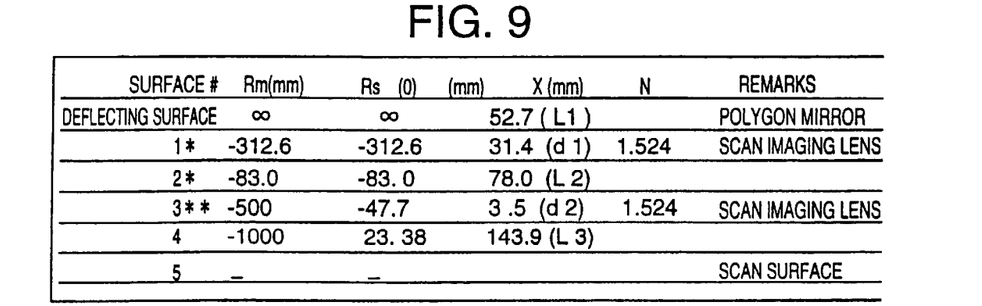
FIG. 9 is a chart showing design values for the optical system.

The optical system is designed such that design values of the elements after the deflector are selected as shown FIG. 9. In FIG. 9, notations are as follows:

Rm: radius of curvature in a meridional direction;
Rs: radius of curvature in a sagittal direction;
N: refractive index at used wavelength; and
X: distance along optical axis.

In FIG. 9, surfaces accompanied by a symbol * are non-spherical surfaces having a common axis which may be shown by an equation:

$$X=\{(Y^2/R)\}/[1+\sqrt{\{1-(1+K)*(Y/R)^2\}}]+A*Y^4+B*y^6+C*y^8+D*Y^{10}\quad(1).$$

Surface #1 has Values:
K=2.667, A=1.79E-07, B=-1.08E-12, C=-3.18E-14, and D=3.74E-18.

Surface #2 has Values:
K=0.02, A=2.50E-07, B=9.61E-12, C=4.54E-15, and D=-3.03E-18.

A surface accompanied by a symbol ** has a non-arcuate shape in the main scan direction and the radius of curvature in the sub-scan direction varies continuously in accordance with the height of the lens.

The shape of surface #3 in the main scan direction is expressed by equation (1). Surface #3 has values:
K=-71.73, A=4.33E-08, B=-5.97E-13, C=-1.28E-16, and D=5.73E-21.

For surface #3, a radius of curvature in a plane perpendicular to the direction of deviation Rs(Y) can be expressed as a polynomial:

$$Rs(Y)=Rs(0)+\Sigma bj\cdot Y^j (j=1,2,3\ldots),$$

where Y is a variable representing the distance from the optical axis along a direction corresponding to the main scan direction.

Surface #3 is symmetrical about the optical axis in the direction corresponding to the main scan direction, and has values:

Rs(0)=-47.7, B2=1.60E-03,
B4=-2.32E-07, B6=1.60E-11,
B8=-5.61E-16, B10=2.18E-20,
B12=-1.25E-24.

In order to change the optical path length, a plane mirror is provided between the first imaging lens (surface #2) and the second imaging lens (surface #3) of the scan imaging optical system B. The mirror is inclined through 26° in a sub-scanning cross section.

Due to the fact that component errors and component mounting errors occurs independently for the scan imaging optical system A and the scan imaging optical system B, relative dot position offset is produced in the main scan direction. However, as shown in FIGS. 8A and 8B, there are two types of relative dot position offset in the main scan direction depending on the factors producing the dot position offset.

Figure 8A:
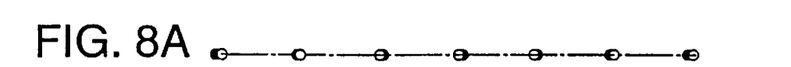
FIG. 8A is a diagram showing dot position offset of type A produced on the scan surface.
Figure 8B:
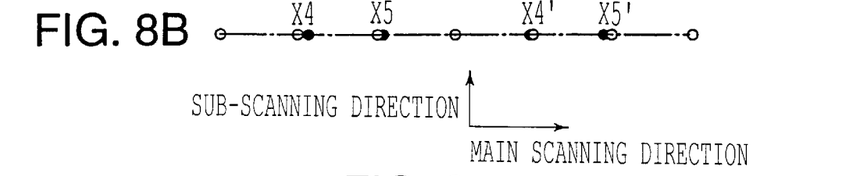
FIG. 8B is a diagram showing dot position offset of type B produced on the scan surface.

FIG. 8A is a diagram showing an example in which relative dot position offsets occur in an asymmetrical manner (type A) and FIG. 8B is a diagram showing an example in which relative dot position offsets occur in a symmetrical manner (type B) relative to illustrated offsets X4, X4', X5, and X5'. For the sake of clarity, the correction of the dot position offset of type A and the correction of dot position offset of type B will be discussed separately.

Figure 6:
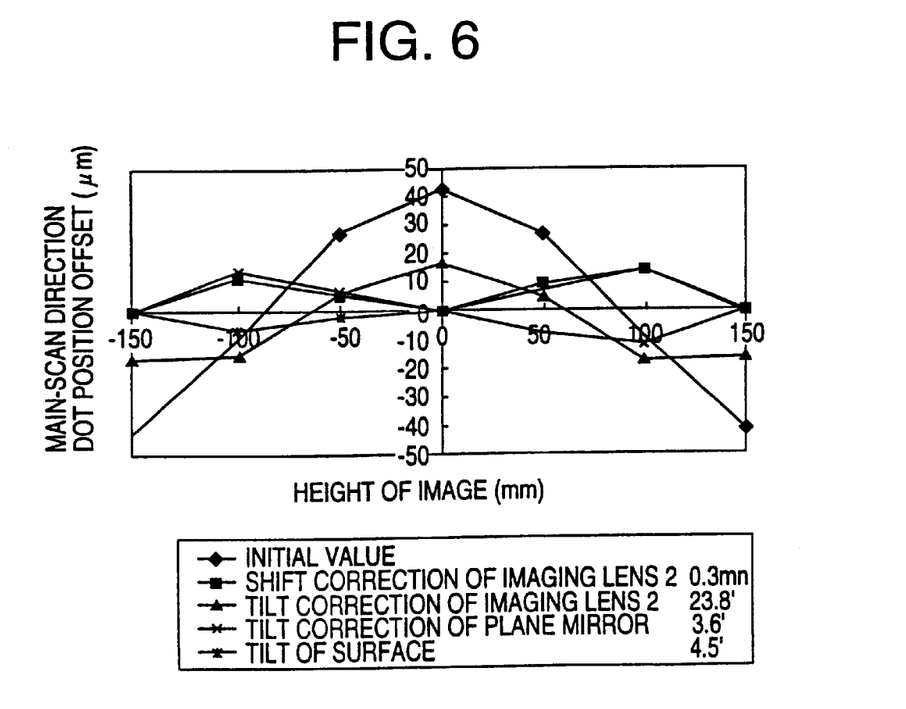
FIG. 6 is a graph showing dot position offsets on a scan surface for an initial state and for states after various adjustments.

FIG. 6 is a graph showing relative dot position offset after adjusting an initial value having a relative dot position offset of type A by various adjustments (1) to (4) described below.

(1) Adjustment by shifting the second imaging lens in the first scan direction through 0.3 mm.

(2) Adjustment by rotating the second imaging lens about an axis perpendicular to the main scan direction for 23.8'.

(3) Adjustment by rotating the plane mirror situated between the first imaging lens and the second imaging lens about an axis perpendicular to the main scan direction for 3.6'.

(4) Adjustment by rotating the scan surface about an axis perpendicular to the main scan direction for 4.5'.

As has been described above, the second imaging lens has a power in the main scan direction. Therefore, the relative dot position offset in the main scan direction in the mutually different scan surfaces can be corrected by shifting the second imaging lens as described as item (1), or, by tilting (rotating) the second imaging lens as described as item (2).

Also, as in item (3) described above, the relative dot position offset in the main scan direction in the mutually different scan surfaces can be corrected by rotating the plane mirror about an axis perpendicular to the main scan direction. When the plane mirror is adjusted by rotating it, there arises an unwanted scan line inclination. The scan line inclination may be corrected by providing a scan imaging element (second imaging lens) in the scan imaging optical system, which scan imaging element having a greater power in the sub-scan direction than in the main scan direction. Then the scan imaging element may be rotated about the optical axis to compensate for the scan line inclination.

Further, as in item (4), the relative dot position offset in the main scan direction in the mutually different scan surfaces can be corrected by rotating the scan surface about an axis perpendicular to the main scan direction.

Figure 7:
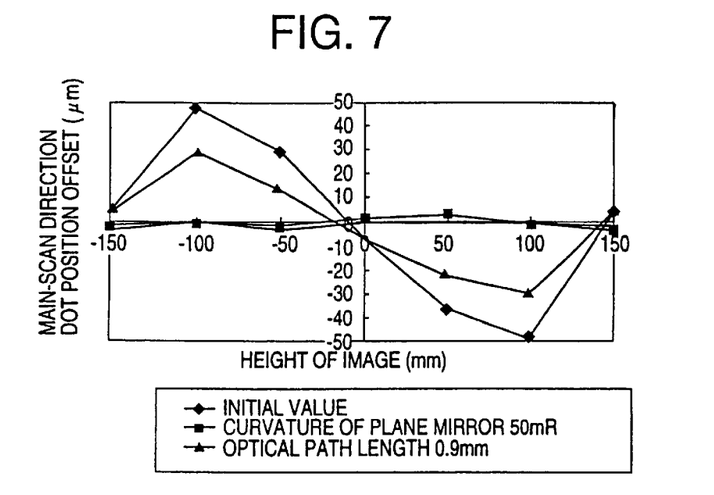
FIG. 7 is a graph showing dot position offsets on a scan surface for an initial state and for states after various other adjustments.

FIG. 7 is a graph showing relative dot position offset after adjusting an initial value having a relative dot position offset of type B shown in FIG. 8B by various adjustments (1) to (4) described below.

(1) Adjustment of curvature of the plane mirror: 50 mR.
(2) Adjustment of optical path length from the deflector to the scan surface.

In order to perform the adjustment of curvature of the plane mirror in item (1), the plane mirror may be fixed at both edge parts in the main scan direction and the center region is pressed such that the plane mirror is curved. The degree of curvature can be adjusted by adjusting the pressing force in the center region. Thus, the relative dot position offset can be corrected in the main scan direction in the mutually different scan surfaces.

As a method of altering the optical path length from the deflector to the scan surface as in item (2), there is a method in which the position of the plane mirror for altering the optical path length may be displaced along the optical axis or a method in which the scan surface itself is displaced along the optical axis. Thus, the relative dot position offset can be corrected in the main scan direction in the mutually different scan surfaces.

Also, when the optical length is altered, there may be a variation in the diameter of a beam spot. However, this may be mitigated by altering the optical length within a range having small variation of the diameter of the beam spot and further displacing the optical element situated in front of the defector. Thus, beam spots having a constant diameter can be obtained.

Figure 3:
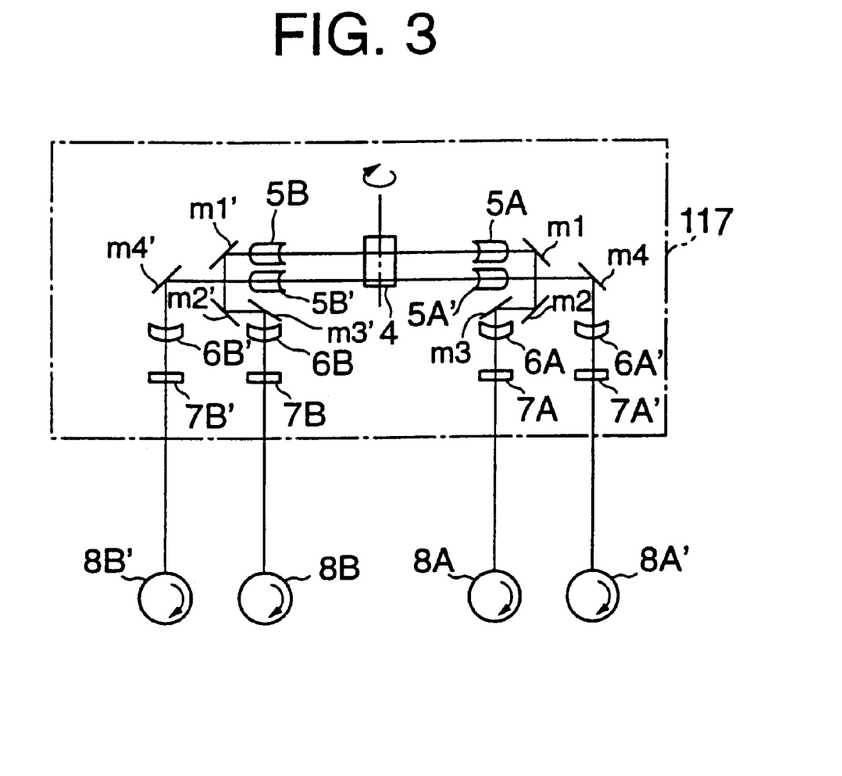
FIG. 3 is an illustration of the optical scanning device of the present invention along a sub-scan plane.

FIG. 3 is a diagram showing an embodiment of an optical scanning device for four colors as a cross-sectional diagram in the sub-scanning plane. A scan-imaging optical system on the right is labeled with a symbol A and a scan-imaging optical system on the left is labeled with a symbol B. Each optical system includes the following elements:

- 5A, 5A', 5B, 5B': first scan-imaging lens (first imaging lens);
- 6A, 6A', 6B, 6B': second scan-imaging lens (second imaging lens);
- 7A, 7A', 7B, 7B': dust-proof glass;
- 8A, 8A', 8B, 8B': surface to be scanned (scan surface); and
- m1–m4, m1'–m4': plane mirror.

The embodiment shown in FIG. 3 is configured as an optical scanning device for four colors by duplicating the configuration of embodiment of FIG. 1 along axis of rotation of the deflector 4. However, since the scan surfaces are image carrier such as photosensitive drums, these cannot be arranged on top of each other. Accordingly, four scan surfaces 8A, 8A', 8B, 8B' are arranged in parallel. In the scan optical systems corresponding to the scan surfaces, respectively, the plane mirrors m1–m4, m1'–m4' for diffracting the optical path length are situated between the first imaging lenses 5A, 5A', 5B, 5B' and the second imaging lenses 6A, 6A', 6B, 6B'. The number and positions of the plane mirrors are altered in order to direct the deflected rays to the scan surfaces 8A, 8A', 8B, 8B'.

Now, the positioning relationship between the plane mirrors m1–m4, m1'–m4' in the embodiment shown in FIG. 3 will be described in detail.

The scan surface 8A' situated at the right position in the figure is scanned by the converging rays that have been deflected at the deflector 4, passed through the first imaging lens 5A', bent by the plane mirror m4, and passed through the second imaging lens 6A' and the dust-proof glass 7A'.

The scan surface 8A situated at the second right position in the figure is scanned by the converging rays that has been deflected at the deflector 4, passed through the first imaging lens 5A, bent by the plane mirror m3, and passed through the second imaging lens 6A and the dust-proof glass 7A.

The scan surface 8B situated at the second left position in the figure is scanned by the converging rays that has been deflected at the deflector 4, passed through the first imaging lens 5B, bent by the plane mirror m3', and passed through the second imaging lens 6B and the dust-proof glass 7B.

The scan surface 8B' situated at the left position in the figure is scanned by the converging rays that has been deflected at the deflector 4, passed through the first imaging lens 5B', bent by the plane mirror m4', and passed through the second imaging lens 6B' and the dust-proof glass 7B'.

The positions of the plane mirrors m1–m4, m1'–m4' are adjusted such that the optical path length from the deflecting surfaces of the deflector 4 to each of the scan surfaces 8A, 8A', 8B, 8B' are equal. As has been described above, at least one plane mirror provided in each of the optical scanning optical system is configured in a manner adjustable by shifting its position along the optical axis, by rotating about an axis perpendicular to the main scan direction or by adjusting its curvature, such that relative dot position offset in the main scan direction on different scan surfaces can be corrected.

Figure 4:
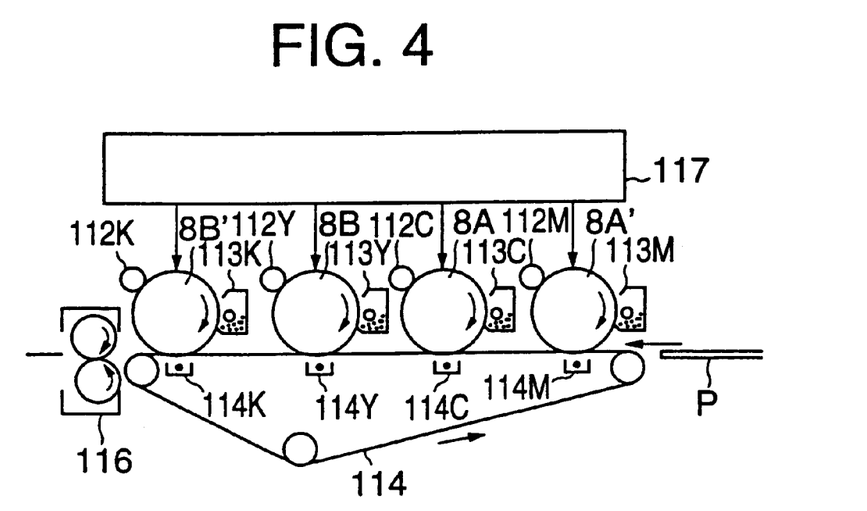
FIG. 4 is an illustration of an embodiment of an image-forming device using the optical scanning device shown in FIG. 1.

FIG. 4 is a diagram showing an embodiment of an image-forming device using the optical scanning device for four colors using the optical scanning device described above. The image-forming device of the present embodiment is similar to a normal multi-color image-forming device in that images are written on an image carrier by optical scanning and an image is formed on a sheet of transfer paper by an electro photographic process. The image processing-device includes components shown below:

- 117: optical scanning device;
- 112M–113K: charging part;
- 113M–113K: developing part;
- 114M–114K: transferring part;
- 114: transferring belt; and
- 116: fixing part.

The references indicating the charging parts, the developing parts and the transferring parts are accompanied by alphabets used for distinguishing between colors of the images: M for magenta, C for cyan, Y for yellow and K for black.

The scan surface 8A' corresponds to magenta. The charging part 112M, the developing part 113M and the transferring part 114M are provided around an image carrier which forms the scan surface 8A'. The scan surface 8A corresponds to cyan. The charging part 112C, the developing part 113C and the transferring part 114C are provided around an image carrier which forms the scan surface 8A. The scan surface 8B corresponds to yellow. The charging part 112Y, the developing part 113Y and the transferring part 114Y are provided around an image carrier which forms the scan surface 8B. The scan surface 8B' corresponds to black. The charging part 112K, the developing part 113K and the transferring part 114K are provided around an image carrier which forms the scan surface 8B'.

The scan surfaces 8A', 8A, 8B and 8B' are uniformly charged by the charging parts 112M, 112C, 112Y and 112K. The scan surfaces 8A', 8A, 8B and 8B' are scanned in the main scan direction by optical rays corresponding to each color emitted from the optical scanning device 117 of the above-described structure. Also, sub-scanning is performed by rotating the scan surfaces 8A', 8A, 8B and 8B' in a clock-wise direction. Thus, images corresponding to each color are written on the scan surfaces 8A', 8A, 8B and 8B' as electrostatic latent images. The latent images are developed in the developing parts 113M, 113C, 113Y and 113K using toners of corresponding colors, respectively. Thus, toner images are formed.

The transfer belt 114 extends underneath the image carriers forming the scan surfaces 8A', 8A, 8B and 8B', respectively, such that a sheet of transfer paper P is conveyed while driving the transfer belt 114. As the sheet of transfer paper P is conveyed, the above-described toner images are transferred on the sheet of transfer paper P by the transfer parts 114M, 114C, 114Y and 114K. Thus, a magenta image, a cyan image, a yellow image and a black image are superimposed on the sheet of transfer paper P to produce a color image. The sheet of transfer paper P passes through the fixing part 116 to fix the color image on the sheet of transfer paper P.

As has been described above, the optical scanning device 117 is provided with various adjustment means for preventing or reducing dot position offsets in the main scan direction on each scan surface. Accordingly, color images with improved quality having no color offset or reduced color offset can be formed on the sheet of transfer paper P.

Also, in the illustrated embodiment, a single deflector is commonly used for different scan surfaces. However, deflectors can be provided for each scan surface. As in the embodiment of the illustrated scan imaging optical system, the first and second scan imaging optical elements may be formed of two separate elements or may be formed as a single scan imaging optical element. Also, the scan imaging optical system is not limited to a lens system, but may also be formed of a reflection mirror system. Further, the present invention is not limited to these embodiments, and variations and modifications may be made without departing from the scope of the present invention.

The present application is based on Japanese priority application No. 2000-303138 filed on Oct. 3, 2000, the entire contents of which are hereby incorporated by reference.

What is claimed is:

1. An optical scanning device, comprising:
a plurality of light sources;
a drive circuit connected to said light sources to drive said light sources independently from each other in a modulating manner;
a deflector having a plurality of deflecting surfaces to deflect rays emitted from said light sources;
scan imaging optical systems directing said deflected rays onto respective scan surfaces;
synchronization detection means for receiving the rays being directed by the respective scan imaging optical systems and outputting synchronization detection signals before a respective writing operation on each of the respective scan surfaces starts;
delay time adjusting means for adjusting time periods after the synchronization detection means output said synchronization detection signals until starting each respective writing operation; and
frequency adjustment means for adjusting driving frequencies of said light sources,
wherein said delay time adjustment means and said frequency adjustment means are adjusted such that a sense of position offset in a main scan direction between a dot formed on one of the respective scan surfaces and a dot formed on another one of the respective scan surfaces in at least one end region of the effective write-in width is opposite to a sense of position offset in the main scan direction between a dot formed on one of the respective scan surfaces and a dot formed on another one of the respective scan surfaces in a center region of the effective write-in width.

2. The optical scanning device as claimed in claim 1, wherein said delay time adjustment means and said frequency adjustment means are further adjusted such that a sense of position offset in a main scan direction between a dot formed on one of the respective scan surfaces and a dot formed on another one of the respective scan surfaces in one of the end regions of the effective write-in width is the same as a sense of position offset in the main scan direction between a dot formed on one respective scan surface and a dot formed on the other respective scan surface in another one of the end regions of the effective write-in width.

3. The optical scanning device as claimed in claim 2, wherein said delay time adjustment means and said frequency adjustment means are adjusted such that amounts of position offsets in the main scan direction at both end regions of the effective write-in width and at the center region of the effective write-in width are equal.

4. The optical scanning device as claimed in claim 1, wherein said scan imaging optical system further comprises:
at least one scan imaging optical element having a power in the main scan direction; and
shift adjusting means for shifting and adjusting said scan imaging optical element in the main scan direction such that relative dot position offsets in the main scan direction formed on the respective scan surfaces are corrected.

5. A multi-color image-forming device using an optical scanning device, comprising:
a plurality of light sources;
a drive circuit connected to said light sources to drive said light sources independently from each other in a modulating manner;
a deflector having a plurality of deflecting surfaces to deflect rays emitted from said light sources;
scan imaging optical systems directing said deflected rays onto respective scan surfaces;
synchronization detection means for receiving the rays being directed by the scan imaging optical systems and outputting synchronization detection signals before a respective writing operation on each of the respective scan surfaces starts;

delay time adjusting means for adjusting time periods after the synchronization detection means output said synchronization detection signals until starting each respective writing operation; and frequency adjustment means for adjusting driving frequencies of said light sources, wherein said respective scan surfaces comprise respective image carriers, dots corresponding to different colors are formed on the respective image carriers, said delay time adjustment means and said frequency adjustment means being adjusted such that a sense of position offset in a main scan direction between a dot formed on one of the respective image carriers corresponding to one of the colors and a dot formed on another one of the respective image carriers corresponding to another one of the colors in at least one end region of the effective write-in width is opposite to a sense of position offset in the main scan direction between a dot formed on one of the respective image carriers corresponding to one of the colors and a dot formed on another one of the respective image carriers corresponding to another one of the colors in a center region of the effective write-in width.

6. The optical scanning device as claimed in claim 5, wherein said delay time adjustment means and said frequency adjustment means are further adjusted such that a sense of position offset in a main scan direction between a dot corresponding to one of the colors and a dot corresponding to another one of the colors in one of the end regions of the effective write-in width is the same as a sense of position offset in the main scan direction between a dot corresponding to one of the colors and a dot corresponding to another one of the colors in another one of the end regions of the effective write-in width.

7. The optical scanning device as claimed in claim 6, wherein said delay time adjustment means and said frequency adjustment means are adjusted such that amounts of position offsets in the main scan direction at both end regions of the effective write-in width and at the center region of the effective write-in width are equal.

8. An optical scanning device comprising:

a plurality of light sources;

a drive circuit connected to said light sources to drive said light sources independently from each other in a modulating manner;

a deflector having a plurality of deflecting surfaces to deflect rays emitted from said light sources;

scan imaging optical systems directing said deflected rays onto respective scan surfaces; and correction means for correcting relative position offsets between dots formed on the respective scan surfaces in the main scan direction by providing a sense of position offset in a main scan direction between a dot formed on one of the respective scan surfaces and a dot formed on another one of the respective scan surfaces in at least one end region of the effective write-in width is opposite to a sense of position offset in the main scan direction between a dot formed on one of the respective scan surfaces and a dot formed on another one of the respective scan surfaces in a center region of the effective write-in width.

9. The optical scanning device as claimed in claim 8, further comprising at least one scan imaging optical element having a power in the main scan direction, and wherein said correction means comprises rotation adjustment means for adjusting said scan imaging optical element by rotating it about an axis perpendicular to the main scan direction.

10. The optical scanning device as claimed in claim 8, further comprising at least one plane mirror for refracting the optical path, and wherein said correction means comprises rotation adjustment means for adjusting said plane mirror for refracting the optical path by rotating said plane mirror about an axis perpendicular to the main scan direction.

11. The optical scanning device as claimed in claim 10, wherein said scan imaging optical system includes scan imaging element having a greater power in the sub-scan direction than in the main scan direction, and wherein said optical scanning device further comprises a rotation adjustment means for adjusting said scan imaging element by rotating it about an optical axis so as to correct inclination of scan lines produced due to rotational adjustment of said plane mirror.

12. The optical scanning device as claimed in claim 8, further comprising at least one plane mirror for refracting the optical path and curvature adjustment means for adjusting the curvature of said plane mirror for refracting the optical path.

13. The optical scanning device as claimed in claim 8, wherein said correction means comprises means for adjusting the optical path length from the deflector to the scan surface.

14. The optical scanning device as claimed in claim 8, wherein said correction means comprises rotation adjusting means for adjusting the scan surface about an axis perpendicular to the main scan direction.

15. The optical scanning device as claimed in claim 8, further comprising at least one scan imaging optical element having a power in the main scan direction, and wherein said correction means comprises shift adjustment means for adjusting said scan imaging optical element by shifting it about an axis perpendicular to the main scan direction.

16. An image-forming device using an optical scanning device including:

a plurality of light sources;

a drive circuit connected to said light sources to drive said light sources independently from each other in a modulating manner;

a deflector having a plurality of deflecting surfaces to deflect rays emitted from said light sources;

scan imaging optical systems directing said deflected rays onto respective scan surfaces; and correction means for correcting relative position offsets between dots formed on the respective scan surfaces in the main scan direction, wherein said respective scan surfaces comprise respective image carriers, electrostatic latent images are produced by forming dots on each of the respective image carriers, and said correction means provides a sense of position offset in a main scan direction between a dot formed on one of the respective image carriers and a dot formed on another one of the respective image carriers in at least one end region of an effective write-in width is opposite to a sense of position offset in the main scan direction between a dot formed on one of the respective image carriers and a dot formed on another one of the respective image carriers in a center region of the effective write-in width.

17. A multicolor image-forming device using an optical scanning device including:

a plurality of light sources;

a drive circuit connected to said light sources to drive said light sources independently from each other in a modulating manner;

a deflector having a plurality of deflecting surfaces to deflect rays emitted from said light sources;

scan imaging optical systems directing said deflected rays onto respective scan surfaces; and correction means for correcting relative position offsets between dots formed on the respective scan surfaces in the main scan direction, wherein said respective scan surfaces comprise respective image carriers, electrostatic latent images corresponding to different colors are produced by forming dots corresponding to said different colors on each of the respective image carriers, and said correction means provides a sense of position offset in a main scan direction between a dot formed on one of the respective image carriers corresponding to one of the colors and a dot formed on another one of the respective image carriers corresponding to another one of the colors in at least one end region of an effective write-in width is opposite to a sense of position offset in the main scan direction between a dot formed on one of the respective image carriers corresponding to one of the colors and a dot formed on another one of the respective image carriers corresponding to another one of the colors in a center region of the effective write-in width.

18. A method of forming a multi-color image using an optical scanning device including a plurality of light sources, a drive circuit connected to said light sources to drive said light sources independently with from each other in a modulating manner, a deflector having a plurality of deflecting surfaces to deflect rays emitted from said light sources and scan imaging optical systems directing said deflected rays onto respective scan surfaces, said method comprising the steps of:

a) receiving the rays before starting to write onto the respective scan surfaces and outputting corresponding synchronization detection signals;

b) adjusting delay time corresponding to a time period after outputting said synchronization detection signals until starting to write on the respective scan surfaces; and c) adjusting driving frequencies of said light sources, wherein said delay time adjusting and said frequency adjusting steps are performed such that a sense of position offset in a main scan direction between a dot formed on one of the respective scan surfaces and a dot formed on another one of the respective scan surfaces in at least one end region of the effective write-in width is opposite to a sense of position offset in the main scan direction between a dot formed on one of the respective scan surfaces and a dot formed on another one of the respective scan surfaces in a center region of the effective write-in width.

19. The method as claimed in claim 18, further comprising adjusting said delay time adjustment means and said frequency adjustment means such that a sense of position offset in a main scan direction between a dot formed on one of the respective scan surfaces and a dot formed on another one of the respective scan surfaces in at least one end region of the effective write-in width is opposite to a sense of position offset in the main scan direction between a dot formed on one of the respective scan surfaces and a dot formed on another one of the respective scan surfaces in a center region of the effective write-in width.

* * * * *